United States Patent [19]

Masuda

[11] 4,119,352
[45] Oct. 10, 1978

[54] HYDRAULIC BRAKING PRESSURE CONTROL UNIT

[75] Inventor: Naosuke Masuda, Higashi-Matsuyama, Japan

[73] Assignee: Jidosha Kiki Co., Ltd., Tokyo, Japan

[21] Appl. No.: 825,026

[22] Filed: Aug. 16, 1977

[30] Foreign Application Priority Data

Nov. 22, 1976 [JP] Japan .................................. 51/140554

[51] Int. Cl.² ................................................ B60T 8/26
[52] U.S. Cl. .................................. 303/6 C; 303/84 A
[58] Field of Search ............... 188/195, 349; 303/6 C, 303/22 A, 22 R, 61, 84 A, 84 R

[56] References Cited

U.S. PATENT DOCUMENTS

| | | | |
|---|---|---|---|
| 3,180,693 | 4/1965 | Stelzer | 303/6 C |
| 3,838,887 | 10/1974 | Stelzer | 303/6 C |

*Primary Examiner*—Duane A. Reger
*Attorney, Agent, or Firm*—Toren, McGeady and Stanger

[57] ABSTRACT

An hydraulic braking pressure control unit for a vehicle includes a first valve member installed at an intermediate point in a flow passage providing communication between the rear brake system of a tandem master cylinder and rear wheel cylinders, the valve member is adapted to open and close the passage, and a proportioning valve is normally urged in one direction to keep the valve member away from its seat to establish communication between the tandem master cylinder and the rear wheel cylinders. The proportioning valve is adapted, when the braking pressure is supplied from the tandem master cylinder, to reduce the braking pressure at a predetermined rate and supply the reduced braking pressure to the rear wheel cylinders. A passage is provided for communication between passages formed upstream and downstream of the proportioning valve, and a second valve member is arranged to open and close the communicating passage. The second valve member has a passage formed on its side facing the opening direction for the flow of the braking pressure for the rear brake system of the tandem master cylinder and also has a passage formed on its side facing the closing direction for the flow of the braking pressure for the front brake system of the tandem master cylinder. The second valve member is in the closed position when it is subjected to the braking pressures of both the rear and front brake systems.

5 Claims, 2 Drawing Figures

HYDRAULIC BRAKING PRESSURE CONTROL UNIT

SUMMARY OF THE INVENTION

This invention relates to an hydraulic braking pressure control unit capable of providing braking force distribution between the front and rear wheels of a vehicle close to an ideal braking force distribution curve. More particularly, the invention concerns such a control unit which, in case of a failure of the front brake system, can introduce the hydraulic braking pressure directly from the master cylinder into the rear wheel cylinders without any pressure reduction.

Among the braking systems known in the art, a typical one comprises a tandem master cylinder having two braking pressure application systems one of which communicates directly with the front wheel cylinders and the other communicates with the rear wheel cylinders through an hydraulic pressure control unit, so that, when the braking force required by the front and rear wheels is below a predetermined level, the braking pressure is admitted as is to the front and rear wheel cylinders and, when the braking force requirement exceeds that level, the braking pressure control unit is actuated to introduce a reduced pressure into the rear wheel cylinders so as to ensure a differential application of the braking force to the front and rear wheels whenever the brake is applied.

The conventional hydraulic braking pressure control unit usually comprises a valve body for opening and closing the flow passage that provides communication between one of the two braking pressure application systems of the tandem master cylinder and the rear wheel cylinders, and proportioning valve means including the valve body, normally the valve means is urged in one direction to keep the valve body away from its seat and establish communication between the one braking pressure application system of the tandem master cylinder and the rear wheel cylinders and, when the hydraulic braking pressure is supplied from the master cylinder, to reduce the braking pressure at a predetermined rate and then supply the reduced pressure to the rear wheel cylinders.

With such a conventional hydraulic braking pressure control unit, as stated, the braking pressure is reduced at a predetermined rate and supplied to the rear wheel cylinders whenever the braking pressure from the master cylinder exceeds the given value, regardless of whether the front brake system is sound or not. This can cause a dangerous situation because the braking force to the rear wheels is seriously decreased when a failure of the front brake system happens.

In recent years, therefore, hydraulic braking pressure control units of improved designs have been proposed which, in case of a failure of the front brake system, can supply a higher-than-normal braking pressure to the rear wheel cylinders.

Such improved units still have drawbacks. They cannot make the braking pressure to be supplied to the rear wheel cylinders equal to the braking pressure generated in the master cylinder. If they could, the mechanism for equalizing the pressure and supplying the equal pressure to the rear cylinders would be so complex or so difficult to machine that the manufacturing cost of the unit would become exorbitantly high.

In accordance with this invention, the hydraulic braking pressure control unit equipped with the proportioning valve as in the prior art design is further provided with a passage for communicating upstream and downstream passages of the proportioning valve and a second valve member for opening and closing the communicating passage. The second valve member is subjected, for its movement to the open position, to the braking pressure being supplied from the tandem master cylinder to the rear brake system and, for its movement to the closed position, to the braking pressure for the front brake system. The second valve member remains in the closed position when subjected to both of the pressures for the rear and front brake systems. With this arrangement it is possible, when the both brake systems are functioning soundly, to supply the rear wheel cylinders with a braking pressure reduced at a predetermined rate by the proportioning valve. Should the front brake system fail and the second valve member be acted upon only by the braking pressure for the rear brake system, the second valve member will be forced open to provide communication through the intermediate passage, whereby the braking pressure from the master cylinder will be directly supplied to the rear wheel cylinders regardless of the position of the proportioning valve.

The present invention is directed to the provision of an hydraulic braking pressure control unit of the simplified construction as briefly outlined above.

The above and other objects and advantages of the invention will become more apparent from the following description taken in connection with the accompanying drawings showing embodiments thereof.

DETAILED DESCRIPTION OF THE INVENTION

Figure 1:
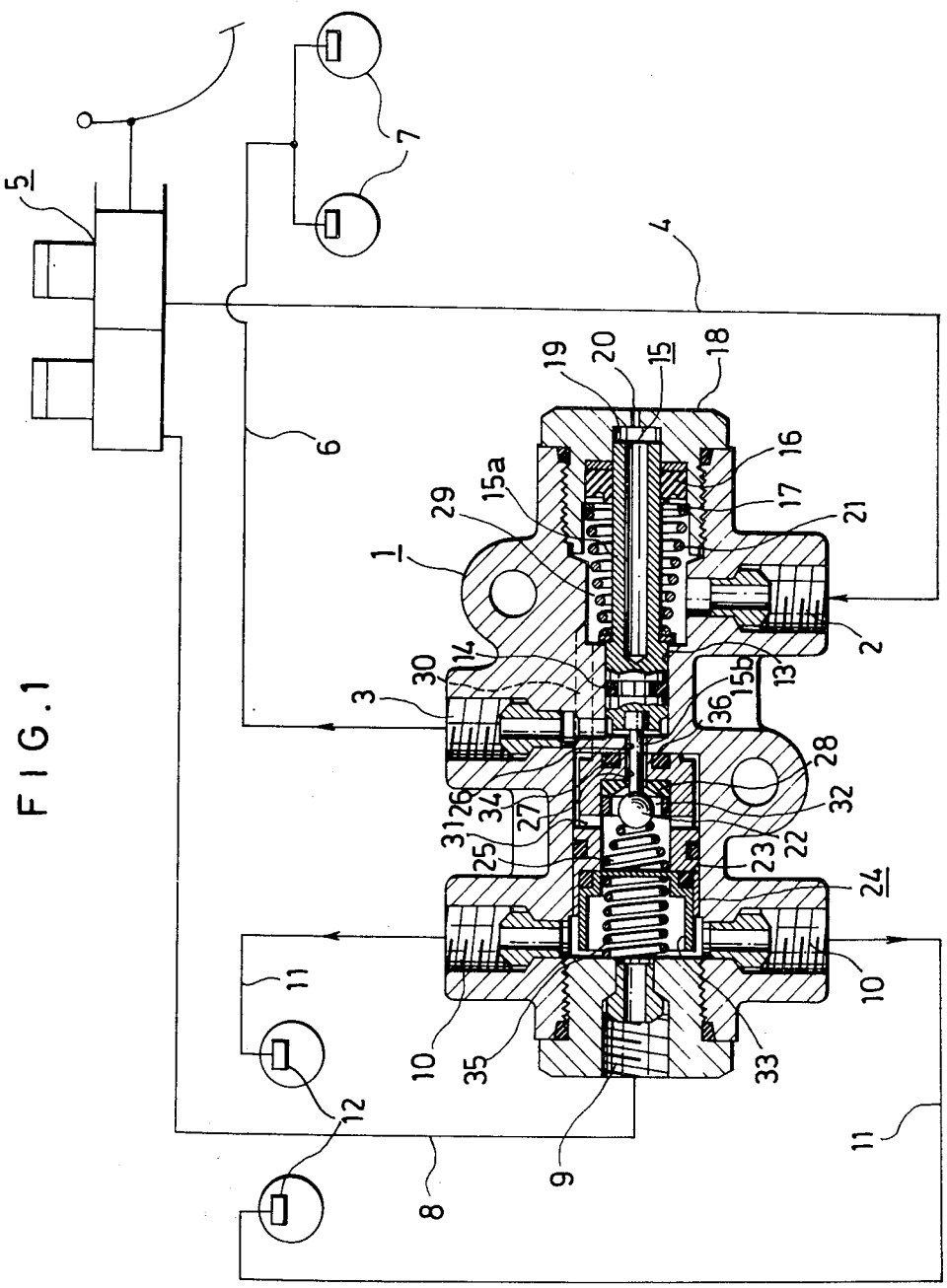
FIG. 1 is a schematic diagram showing, in cross section, the essential parts of an hydraulic braking pressure control unit embodying the invention.

In FIG. 1 an hydraulic braking pressure control unit is shown including a main body 1 having an inlet 2 and an outlet 3. The inlet 2 is connected to one of two braking pressure application systems of a tandem master cylinder 5 through a line 4, and the outlet 3 is connected to rear wheel cylinders 7 through a line 6. As will be described in more detail later, the inlet 2 and the outlet 3 are interconnected so that the braking pressure from the master cylinder can be fed to the rear wheel cylinders 7. The other braking pressure application system of the master cylinder 5 is connected to front wheel cylinders 12, through a line 8, another inlet 9 formed in the body 1, a pair of outlets 10 normally in communication with the inlet 9, and lines 11 connected to the outlets 10.

Reciprocally movable in a bore 13 formed in the body 1 is a plunger 15, which is provided with a seal member 14. The plunger 15 includes a small-diameter portion 15a, the outer end of which extends through a seal member 16 and a support member 17 both formed in the body 1 and fits in a recess 19 of a plug 18 axially concentric with and screwed in the bore 13. Extending from the opposite end of the plunger 15 is a slender rod 15b. The recess 19 is open to the atmosphere through a passage 20.

A spring 21 normally urges the plunger 15 leftwardly as viewed in the drawing, and the lefthand end of the rod 15b bears against a first valve member 22 in the form of a ball. A bore 23 is formed adjacent and axially concentrically with the lefthand end of bore 13, reciprocably receiving a second valve member 24 in which the first valve member 22 in the form of a ball rests. The first valve member 22 is normally urged rightwardly by means of a spring 25.

The rod 15b of the plunger 15 extends loosely through center bores 26, 27 formed in the body 1 and the second valve body 24, respectively, and the rod 15b and the valve body 22 are kept in pressure contact by the restoring forces of the opposing springs 21, 25. The spring 21, designed to exert a greater restoring force than the spring 25, normally acts on the plunger 15 to hold it in the inoperative position shown, causing the rod 15b of the plunger to keep off the valve member 22 from its seat 28 formed around the center bore 27.

As will be described later, the combination of the plunger 15, spring 21, and other associated parts constitute a proportioning valve for reducing the hydraulic braking pressure from the master cylinder 5 at a predetermined rate and supplying the reduced pressure to the rear wheel cylinders 7.

In the state illustrated, communication is established between the inlet 2 and the outlet 3 through a chamber 29 accommodating the spring 21, passage 30, radial passage 31 formed in the second valve member 24, chamber 32, the space between the valve member 22 and the valve seat 28, and center bores 27, 26, so that the braking pressure from the master cylinder 5 can be supplied to the rear wheel cylinders 7.

The second valve member 24 comprises a cylindrical body reciprocably positioned in the bore 23, a retainer 33 fitted in the left end of the body, and the chamber 32 defined in the axial center of the body. The chamber 32 contains the valve body 22, spring 25, and valve seat 28. At the right end of the second valve member 24, there is provided a seal member 34 around the center bores 26, 27, and a spring 35 urges the second valve member 24 rightwardly to press the seal member 34 against the right end wall of the bore 23.

The spring 35 is designed to exert a sufficiently great spring force to remain uninfluenced by any forced displacement of the valve member 22 against the action of the spring 25.

Thus, when the second valve member 24 is in the inoperative position shown, the space between the right end wall of the bore 23 and the right end of the second valve member 24, or a passage 36 to provide communication between the passage 30 on the upstream side of the proportioning valve and the center bore 26 forming the downstream passage of the valve, remains closed by the seal member 34.

Passages connecting the inlet 9 and the outlets 10 on the front brake side are communicated with the bore 23. This permits the left end of the second valve member 24 to be subjected, when necessary, to the braking pressure for the front brake cylinders.

On the other hand, as will be obvious from the above description, the right end of the second valve member 24 is acted upon by the braking pressure for the rear brake cylinders. The second valve member 24 is designed to have equal pressure-receiving areas at both ends so that, when the braking pressures for the both front and rear brake cylinders act at the same time on the valve member 24, that is, when the both braking systems are functioning soundly the actions of the two braking pressures upon the valve member 24 can be counterbalanced.

In the arrangement of the construction described, the hydraulic braking pressure generated in the master cylinder 5 is conducted to the front wheel cylinders 12 via the line 8, inlet 9, outlets 10, and the lines 11. At the same time, the pressure is led to the rear wheel cylinders 7 by way of the line 4, inlet 2, chamber 29, passages 30, 31, chamber 32, space between the valve member 22 and the valve seat 28, center bores 27, 26, outlet 3, and line 6. During this, both ends of the second valve member 24 are subjected to the braking pressures for the front and rear wheel cylinders. The action of these pressures upon the valve member 24, however, is counterbalanced because both pressures are substantially equal and both ends of the valve member 24 have the same pressure-receiving areas. Consequently, the valve member 24 is urged rightwardly by the force of the spring 35 and is in the position where it closes the passage 36.

As for the plunger 15, the hydraulic braking pressure passing through the chamber 29 acts on the shoulder formed between the main body and the small-diameter portion 15a of the plunger 15. Simultaneously, brake fluid at the same pressure flows from the chamber 32 to the center bores 27, 26, acting on the left end of the plunger 15. The plunger 15 then tends to move rightwardly because of the differential areas for braking pressure reception. However, in the early stage of brake application, or while the hydraulic braking pressure is still low, the restoring force of the spring 21 overcomes that tendency and acts on the plunger 15 to hold it in the inoperative position shown. This means that a braking pressure equal to that for the front wheel cylinders is admitted as well to the rear wheel cylinders.

When the hydraulic braking pressure increases and exceeds a predetermined value, the differential pressure receiving areas cause the plunger 15 to move rightwardly against the restoring force of the spring 21. Accordingly, the valve member 22 being urged rightwardly by the spring 25 engages the seat 28, thus preventing an increase in the braking pressure for supply to the rear wheel cylinders 7.

Where the braking pressure is further increased, the valve member 22 in the seated position prevents an increase in the force that acts on the left end of the plunger 15 to move it rightwardly. On the contrary, the force that acts on the shoulder of the plunger 15 to move it leftwardly increases in proportion to the braking pressure. As a result, the plunger 15 again moves leftwardly, forcing the valve member 22 out of engagement with the seat and thereby raising the braking pressure for the rear wheel cylinders 7. When the braking pressure for the rear wheel cylinders 7, that is, the pressure acting on the left end of the plunger 15, has been increased in this way, the pressure in turn forces the plunger 15 to move back rightwardly, seating the valve member 22 again. Thus, after the braking pressure has exceeded the predetermined value, the increased braking pressure causes the plunger 15 to move to the left and right, thereby raising the braking pressure in the rear wheel cylinders 7 at a lower rate than the pressure on the part of the master cylinder 5 for the front wheel cylinders 12.

In this manner described, the unit functions as a proportioning valve.

In case where the braking pressure for the front brake system becomes unavailable due to a failure of the front brake system, the second valve member 24 is subjected to the braking pressure for the rear system alone. Therefore, the second valve member is forced leftwardly against the force of the spring 35, by a braking pressure lower than the level usually required for driving the plunger 15 rightwardly, thus providing communication between the passage 36 and the associated passages. Initially, when the pressure is low, the valve member 22 is not in the closed position on its seat 28 and allows the fluid to flow through the gap. As the pressure increases, the valve member 22 is seated on the seat, and the master cylinder 5 and the rear wheel cylinders 7 are no longer communicated through the gap between the valve member 22 and the seat 28 but are directly communicated through the passage 36.

Thereafter, regardless of the operation of the proportioning valve, a braking pressure equal to the pressure produced in the master cylinder 5 is supplied to the rear wheel cylinders 7 to give a powerful braking action.

Figure 2:
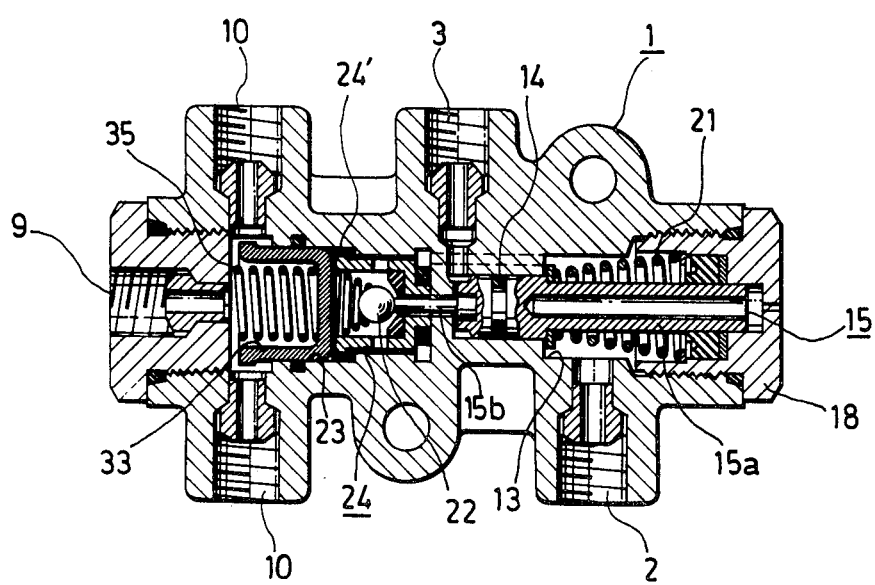
FIG. 2 is a sectional view of still another embodiment of the invention.

FIG. 2 shows another embodiment, in which the retainer 33 for the second valve member 24 is welded to the body portion 24' of the member. Otherwise the embodiment is the same as that of FIG. 1 both in construction and operation. The plunger 15 may be operatively connected to a vehicle-weight sensing mechanism of a conventional type to obtain a favorable curve of braking force distribution among the front and rear wheels at all times in disregard of the loaded conditions.

In accordance with this invention, as stated hereinabove, a second valve member for opening and closing a communicating passage is installed therein midway between the upstream and downstream passages of a proportioning valve, and this second valve member is subjected to the braking pressures for the rear and front brake systems. With such an extremely simplified construction it is possible, in case of a failure of the front brake system, to supply the rear wheel cylinders with a braking pressure equal to that generated in the master cylinder, thus enhancing the safety against the failure of the front brake system to advantage.

Moreover, under the invention, the proportioning valve and the second valve member are separately built, and therefore they can be easily machined and assembled together in relative positions without the need of meeting any exacting requirement for dimensional accuracy. This ease of machining combines with the aforesaid simplicity of construction to offer an important advantage of the possibility of manufacturing the unit at low cost.

What is claimed is:

1. In an hydraulic braking pressure control unit for use in the braking system of a vehicle which braking system includes a tandem master cylinder, front wheel cylinders and rear wheel cylinders, said control unit arranged to be positioned between the tandem master cylinder and the rear wheel cylinders, said control unit including a body having a bore therein forming a first flow passage with a valve seat therein and the first flow passage providing communication between the tandem master cylinder and the rear wheel cylinders, a first valve member located in said flow passages and displaceable relative to said valve seat in said first flow passage so that when said first valve member contacts said valve seat it closes said first flow passage and when said first valve member is spaced from said valve seat it opens said first flow passage, wherein the improvement comprises a proportioning valve located in said first flow passage in contact with said first valve member and cooperating with said first valve member for reducing the braking pressure to the rear wheel cylinders at a predetermined rate compared to the braking pressures applied from the tandem master cylinder, said first flow passage including a first part upstream from said proportioning valve and a second part downstream from said proportioning valve, a second flow passage within said body interconnecting the first part and second part of said first flow passage and bypassing said proportioning valve, a second valve member displaceably located within said body for opening and closing said second flow passage, said second valve member having a first surface arranged to be exposed to the braking pressures supplied from the tandem master cylinder to the rear wheel cylinders and a second surface arranged to be exposed to the braking pressures supplied from the tandem master cylinder to the front wheel cylinders, said first and second surfaces of said second valve member being arranged so that said second valve member closes said second passage when the first and second surfaces of said second valve member are subjected to the braking pressure from the tandem master cylinder to the rear wheel cylinders and front wheel cylinders, respectively.

2. In an hydraulic braking pressure control unit, as set forth in claim 1, wherein said body having a third flow passage providing communication between the tandem master cylinder and the front wheel cylinders, said second surface of said second valve being located within said third passage, and said first surface of said second valve being located within said first flow passage.

3. In an hydraulic braking pressure control unit, as set forth in claim 2, wherein said first and second surfaces of said second valve member having equal pressure contacting areas, and a spring located within said body and contacting said second valve member for urging said second valve member into position for closing said second flow passage.

4. An hydraulic braking system control unit for use in a vehicle braking system including a tandem master cylinder having a rear wheel part and a front wheel part, front wheel cylinders and rear wheel cylinders, said control unit comprising a main body having a first inlet and first outlet formed therein, a line connected to said first inlet and arranged to be connected to the rear wheel part of said tandem master cylinder, a second line connected to said outlet and arranged to be connected to the rear wheel cylinders, a first bore formed in said body communicating between said first inlet and said first outlet, a plunger positioned within and reciprocally movable through said first bore, said plunger having a first pressure-receiving area at one end thereof and a second pressure-receiving area smaller than said first area at the opposite end thereof, a spring located within said first bore adjacent the end of said plunger having the smaller receiving area and said spring biasing said plunger in the direction from the second area and toward the first area end thereof, a second inlet in said body, a third line connected to said second inlet and arranged to be connected to the front wheel part of the tandem master cylinder, a second outlet in said body, a fourth line connected to said second outlet and arranged to be connected to the front wheel cylinders, a second bore formed in said body separate from and in axial alignment with said first bore, said second bore communicating with said second inlet and second outlet, a second valve member positioned within and reciprocably movable through said second bore, said second valve member having equal pressure-receiving areas at the opposite ends thereof, a spring positioned within said body in contact with said second valve member for biasing said second valve member toward said plunger in said first bore, a third bore formed in said body extending between the adjacent ends of said first and second bores and said third bore having a smaller diameter than said first bore, a valve seat located in the end of said second bore adjacent to said third bore, said plunger having a small diameter portion extending through said third bore into said second bore, a first valve member located within said second bore in alignment with said small diameter portion of said plunger, another spring located in said second bore and extending between said second valve member and said first valve member for biasing said first valve member toward said valve seat, and a flow passage communicating between said first and second bores, and a bypass passage formed between the end of said second valve member at the junction of said second and third bores and said bypass passage being closeable by said second valve member.

5. An hydraulic braking pressure control unit, as set forth in claim 4, wherein said second valve member forming a chamber therein, a fourth bore in said second valve member communicating between said chamber and said third bore, said small diameter portion of said plunger extending through said fourth bore into said chamber, and said first valve member and said valve seat located within said chamber.

* * * * *